United States Patent Office 2,894,033
Patented July 7, 1959

2,894,033

ANTISPASMODIC 1,1-DIPHENYL-3-DIALKYLAMINOPROPANE, AND ITS TERTIARY AND QUATERNARY SALTS

Paul A. J. Janssen, Turnhout, Belgium, and David K. de Jongh, Haarlem, Netherlands, assignors to N. V. Nederlandsche Combinatie voor Chemische Industrie, Amsterdam, Netherlands, a company of Belgium, and Laboratoria Pharmaceutica Dr. C. Janssen, N.V., Turnhout, Belgium, a company of Belgium No Drawing. Application September 10, 1956
Serial No. 608,710

Claims priority, application Netherlands
November 15, 1955

4 Claims. (Cl. 260—567.6)

This invention relates to 1,1-diphenyl-3-dialkylaminopropanes, their tertiary and quaternary salts and methods of preparing them.

It is well known that 1,1-diphenyl-3-dialkylaminopropanes are neurotropic and musculotropic antispasmodics. Several of these compounds are described in the literature. (See e. g. Sander, Arzneimittel Forsch. 4, 183, 257, 375 (1954)). It appears from this literature that the tertiary and quaternary salts of the 1,1-diphenyl-3-(N-piperidino)-propane are more active and less toxic than the other 1,1-diphenyl-3-dialkylaminopropanes which are active as neurotropic and musculotropic antispasmodics. (See e.g. Schaumann, Medizin u. Chem. 4, 229 (1942), Kleiderer et al., BIOS rapport No. P.B.–981 (1945) and White, Green and Hudson, Brit. J. Pharmacol. 6, 560 (1951). Moreover, all efforts to enhance the activity by branching, lengthening or shortening of the propane chain failed completely. (See Lands, J. Pharmacol. exptl. Ther. 102, 219 (1951), Ruddy et al., J. Am. Chem. Soc. 72, 718 (1950) and 73, 4096 (1951), Benoit, Compt. rend. 232, 1252 (1951).

It has now been found that the tertiary and quaternary salts with non-toxic anions of 1,1-diphenyl-3-diisopropylamino-propane, which have not yet been described in the literature, are more active and less toxic neurotropic and musculotropic antispasmodics than the tertiary and quaternary salts of 1,1-diphenyl-3-(N-piperidino)-propane, which have been considered up till now as the most active compounds.

This will be further elucidated by the following table.

| | 1,1-diphenyl-3-(N-piperidino)-propane as a salt of— | | 1,1-diphenyl-3-diisopropylamino-propane as a salt of— | |
|---|---|---|---|---|
| | HCl | CH₃I | HCl | CH₃I |
| Toxicity LD₅₀ in mg/kg: | | | | |
| intravenous (mice) | 30 | | 30 | |
| oral (mice) | 270 | | 320 | |
| Baryolytic action on isolated intestine of rabbit (papaverine=1) | 2 | <1 | 6 | <1 |
| Atropine action on isolated intestine of the rabbit (acetylcholine-spasm) (atropine=100) | 1 | 3 | 2.5 | 30 |
| Mydriasis (intraperitoneally with mice) | 0.5 | 4.5 | 1.0 | 9 |
| Antinicotinic action with mice in mg/kg | 40 | | 20 | |

As already indicated in the table, it was further found that the tertiary salts with non-toxic anions exhibited an antinicotinic action. In this respect the new compound is more active also than the known 1,1-diphenyl-3-dialkylamino-propanes.

The tertiary salts of 1,1-diphenyl-3-diisopropylaminopropane with acids containing non-toxic anions, can be used in the treatment of Parkinson's disease, while the tertiary salts, as well as the quaternary methylhalides of this base can be used as substitutes for atropine and/or papaverine.

The 1,1-diphenyl-3-diisopropylamino-propane can be prepared by many methods known in the literature for analogous compounds. Thus, it can be prepared by an Eisleb-condensation from diphenylmethane and 1-halogeno-2-diisopropylamino-ethane or by reaction of 1,1-diphenyl-3-halogenopropane and diisopropylamine. Further, it can be prepared by reduction of 1,1-diphenyl-3-diisopropylamino-propanol-1 with red phosphorus and hydroiodic acid in glacial acetic acid or by dehydration of this propanol and catalytic hydrogenation of the propene obtained. Starting from the α,α-diphenyl-γ-diisopropylamino-butyronitrile, it can be prepared by saponification of this nitrile to the acid and splitting off carbon dioxide by pyrolysis.

By preference, however, it is prepared by splitting off the nitrile group from the α,α-diphenyl-γ-diisopropylamino-butyronitrile, e.g. with the aid of sodium amide or an alkyl magnesium halide.

The invention will be further explained by reference to the following examples.

Example I

A vigorously stirred suspension of 0.2 to 1 mole of sodium amide in 200 ml. of xylene, in which 0.1 mole of α,α-diphenyl-γ-diisopropylamino-butyronitrile were dissolved, was boiled for about twelve hours. After this the excess of sodium amide was decomposed with water, the xylene layer was separated, washed with water and extracted with dilute hydrochloric acid. This acidic extract was made strongly alkaline with concentrated lye and the seprated base was extracted with ether. After drying, the ether was evaporated and the 1,1-diphenyl-3-diisopropylamino-propane was distilled in vacuo. From the oil obtained, several tertiary and quaternary salts can be produced by interaction with suitable acids or alkylhalides or other alkyl esters. The hydrochloric acid salt ($C_{21}H_{29}N \cdot HCl$) shows a melting point of 171° C. (Thiele-method), the methiodide ($C_{21}H_{29}N \cdot CH_3I$) a melting point of 186° C. with decomposition. The ultraviolet spectrum in isopropanol of both salts shows three maxima and three minima, respectively with 254, 259.5 and 268.8 and with 240.5, 256 and 267.5 mμ. The molar extinction at 259.5 mμ amounts to 450 ± 10.

Example II

For the preparation of 1000 tablets of 500 mg. each, the following ingredients were intimately mixed:

4–20 grams of 1.1-diphenyl-3-diisopropylamino-propane.
50 grams of amylum.
15 grams of talc magnesium stearate balance sacch. lact. granulated.

This mixture was tabletted in the usual way.

The tertiary and quaternary salts of 1.1-diphenyl-3-diisopropyl-amino-propane can be treated in the same way, using somewhat lower amounts for the quaternary derivatives.

Example III

For the preparation of a powder which can be used in the treatment of Parkinson's disease, 5–25 grams of the hydrochloric acid salt of 1.1-diphenyl-3-diisopropylamino propane was intimately mixed with a balance of sacch. lact. to a weight of 500 grams from which powders were made of 500 mg. each.

What we claim is:

1. A compound selected from the group consisting of 1,1-diphenyl-3-diisopropylaminopropane, and its hydrochloride, hydrobromide, hydroiodide, methiodide, methobromide and methochloride.

2. The hydrochloric acid salt of 1,1-diphenyl-3-diisopropylamino-propane.

3. 1,1-diphenyl-3-diisopropylaminopropane.

4. 1,1-diphenyl-3-diisopropylamino-propane methiodide.

References Cited in the file of this patent

UNITED STATES PATENTS

| | | |
|---|---|---|
| 2,387,873 | Boon et al. | Oct. 30, 1945 |
| 2,662,886 | Ruddy et al. | Dec. 15, 1953 |

FOREIGN PATENTS

| | | |
|---|---|---|
| 693,754 | Great Britain | July 8, 1953 |

OTHER REFERENCES

Ruddy et al.: J. Am. Chem. Soc., 73, p. 4096 (1951).
Ruddy et al.: J. Am. Chem. Soc., 72, p. 718 (1950).
Burckhalter et al.: J. Am. Chem. Soc., 73, pp. 4830–32 (1951).
Adamson: Chem. Abstracts, vol. 44, pp. 584–5 (1950).
Kleiderer et al.: P.B. 981, pp. 38 to 41 (1945).
Beilstein, Band XII, 1st supplement, p. 545.
Wagner et al.: Synthetic Organic Chemistry, 1953, p. 7.